Oct. 4, 1955  P. W. MAURER  2,719,543
AUTOMATIC GRID WINDING AND SWEDGING APPARATUS
Filed Dec. 21, 1949  3 Sheets-Sheet 2

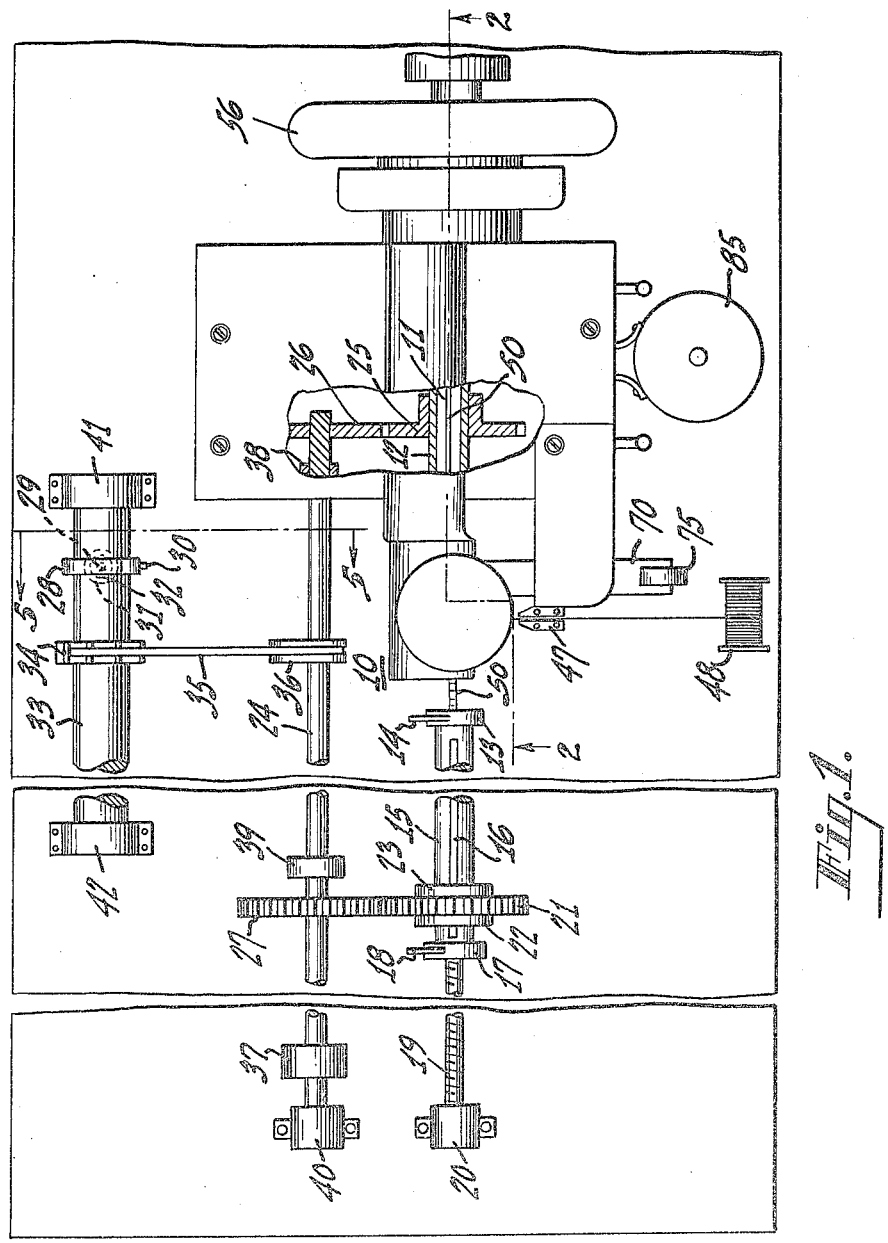

Inventor
PIERRE W. MAURER
By William A. Zalesak
Attorney

Oct. 4, 1955 P. W. MAURER 2,719,543
AUTOMATIC GRID WINDING AND SWEDGING APPARATUS
Filed Dec. 21, 1949 3 Sheets-Sheet 3

Inventor
PIERRE W. MAURER
By William A. Zalesak
Attorney

United States Patent Office 2,719,543
Patented Oct. 4, 1955

2,719,543

AUTOMATIC GRID WINDING AND SWEDGING APPARATUS

Pierre W. Maurer, Nutley, N. J., assignor to Radio Corporation of America, a corporation of Delaware Application December 21, 1949, Serial No. 134,187

5 Claims. (Cl. 140—71.5)

My invention relates to apparatus for automatically fabricating wound grids, and more particularly to a combined grid winding and swedging apparatus for winding grid wire on spaced side rods to form a grid and for forming one or more swedges on the side rods to aid orientation and support of the grid in an electron tube mount.

One type of grid used in electron tubes comprises two spaced side support rods having grid wire fixed thereto and extending thereacross in the form of a helix. Machines for automatically making this type of grid are known. One of such machines includes a rotatable mandrel supporting the grid side rods adjacent a winding head including a notching wheel, a peening wheel and a grid wire feed assembly. The cycle of rotation of the mandrel accomplishes a transverse notching of the side rods to provide a groove therein, a feeding of the grid wire to lie in said groove, and a peening or closing of the groove over the grid wire therein. Preferably a relatively long grid stock is prepared in this manner suitable for subsequent severing to form a plurality of grids.

A grid formed in the manner described may be mounted in an electrode assembly to extend through apertures in insulated spacers provided at the ends of the assembly. In the absence of any critical positioning means on the grid, it is necessary to manually determine the position of the grid in the electrode assembly. It is also necessary to resort to some means for fixing the position of the grid in the assembly. One way of accomplishing this is to rely on a friction fit between the grid side rods and the apertures in the spacers. This however is not satisfactory since the grid is easily displaced in response to vibrations. Another expedient has been to fix metal eyelets in the spacers through which the side rods may extend and to which they may be welded. An objection to this is that it is relatively expensive and does not eliminate the need for a manual positioning of the grid in proper relationship to other electrodes.

In view of the limitations of the proposals referred to for positioning and fixing a grid in an electron tube mount, it has been proposed to provide swedges on the side rods to not only provide a datum means for automatically determining the desired position of a grid in a mount when the swedges abut against a spacer thereof, but in addition, to fix the grid in the mount so as to resist displacement when used in an electron tube.

Accordingly it has been the practice heretofore to apply swedges at critically determined portions of side rods of wound grids to provide the desired datum and fixing means. This practice has involved the use of a separate manually operated swedging tool having a seat for receiving a finished grid and hammer for deforming transverse portions of the side rods of the grid to provide swedges thereon. One objection to this practice is that it involves additional handling of the grid after it is removed from the grid winding machine. Another disadvantage resides in the sacrifice of accuracy in locating the swedge on the side rods. The swedges are located either by reference to ends of the side rods or by reference to the terminal turns of the grid wire thereon. These reference elements on a grid may be distorted during the cutting of a grid strip to form individual grids or during the handling thereof by an operator in preparation for the manual swedging operation.

Accordingly it is the object of the invention to provide an apparatus for automatically and accurately forming swedges on side support rods of wound grids.

Another object is to provide an apparatus for automatically making a wound type of grid and automatically swedging the side rods thereof in one operation.

A further object is to provide a combined grid making and swedging apparatus having a cycle of operation that includes the making of a wound type grid and the forming on the side rods thereof of swedges suitably located.

Another object is to provide a combined grid winding and swedging apparatus wherein the swedging means is applied from opposite directions to prevent deformation of a grid.

A further object is to provide a grid winding apparatus having a swedging means for swedging side rods fed to the apparatus in predetermined spaced relation to grid turns applied to the side rods by the apparatus.

Another object is to provide a grid winding and swedging apparatus wherein the swedging means is rotatable with the winding means in a plane fixed with respect to the winding means, whereby the swedges on several grids are uniformly spaced with respect to predetermined grid turns on said grids.

A further object is to provide a swedging means in a grid winding apparatus in fixed relation to an element of the winding head for actuation during a predetermined portion of a cycle of operation of the winding head for accurately and automatically applying swedges to side rods of wound grids made by the apparatus.

Another object is to provide a combined grid winding and swedging machine wherein a mandrel for supporting the side rods serves as an anvil for receiving the impact of hammers of the swedging unit of the apparatus.

A further object is to provide a combined grid winding and swedging apparatus wherein a mandrel for supporting grid side rod stock, and the swedging unit, are supported in fixed relation in a common sleeve for accurately correlating the swedging step with a desired portion of the cycle of the rotation of the mandrel.

Another object is to provide a combined grid winding and swedging apparatus in which the rotary and longitudinal movement of grid side rod stock with respect to the winding head is correlated with respect to the operation of the swedging unit of the apparatus.

A further object is to provide a combined grid winding and swedging apparatus having a mandrel for supporting on opposite sides thereof side rods during a grid winding operation, and a swedging tool having oppositely disposed radially movable hammers for striking said side rods simultaneously from opposite directions, whereby said mandrel serves as an anvil and said side rods are swedged without otherwise deforming the side rods.

The foregoing objects are attained by an apparatus having a grid winding portion and a swedging portion coacting to provide a wound grid having side rods with accurately located swedges theron.

The grid winding portion includes a winding head comprising a notcher, peener and a grid wire feed assembly. A mandrel extending through the winding head is provided for supporting side rod stock. The mandrel is mounted in a rotatable sleeve extending from a location adjacent the side of the winding head facing the direction from which side rod stock is fed. A portion of the mandrel extends beyond one end of the sleeve referred to and into operative relation with respect to the winding head. Rotation of the sleeve and mandrel with the side rod stock supported on the mandrel, results in fixing grid wire turns on a portion of the side rod stock in registry with the winding head elements. A gripper, movable longitudinally of the side rod stock is provided for gripping the leading end of a grid being wound and moving the side rod stock longitudinally through the winding head to dispose the turns of grid wire helically on the side rods.

The swedging portion of the apparatus includes a flattened cylinder or disc that is integral with a sleeve. The integral sleeve referred to is fixed adjacent the winding head to the sleeve supporting the mandrel for rotation therewith, with the mandrel extending through both sleeves. Radially and oppositely mounted in grooves on one face of the disc referred to are two elongated hammers, a portion of the hammers extending beyond the periphery of the disc. The hammers are moving longitudinally in a direction transverse with respect to the side rod stock for causing their inner ends to selectviely move towards and away from a predetermined longitudinal portion of the stock. The hammers are normally urged radially out and away from the side rod stock.

To move the hammers toward the side rod stock for applying swedges thereto there is provided a lever and cam system for synchronously urging both hammers toward said side row stock. This is accomplished by cam actuated levers movable into the arcuate path of travel of the projecting ends of the hammers during rotation of the supporting disc. Engagement between the projecting ends of the hammers and the levers referrerd to imparts a relatively rapid and hammerlike movement to the hammers toward the center of the disc. The path of travel of the hammers includes a transverse portion of the side rod stock and the impact of the hammers on this portion results in the formation of swedges therein.

The swedging unit of the apparatus is preferably disposed to the side of the winding head to which side rod stock is fed, so that the swedges may be applied to the stock prior to the winding of grid wire thereon. The simultaneous movement of the hammers from opposite directions tends to neutralize the effects of the impact of the hammers on the stock to avoid bending or other deformation thereof. The levers and cam referred to may be actuated by a solenoid controlled by one or more relays energized during predetermined portions of the cycle of grid fabrication. The swedges are therefore accurately and uniformly applied with reference to a selected grid turn and require no separate handling of the grids. There results from the apparatus of the invention, therefore, increased production per unit of time, economy in grid manufacture, reduction in shrinkage, as well as improved grids.

Further objects and advantages of the invention will present themselves as the description proceeds.

Referring to the drawing for a better understanding of the invention,

Figure 1 shows a plan view partly cut away of a grid making apparatus according to the invention;

Figure 3:
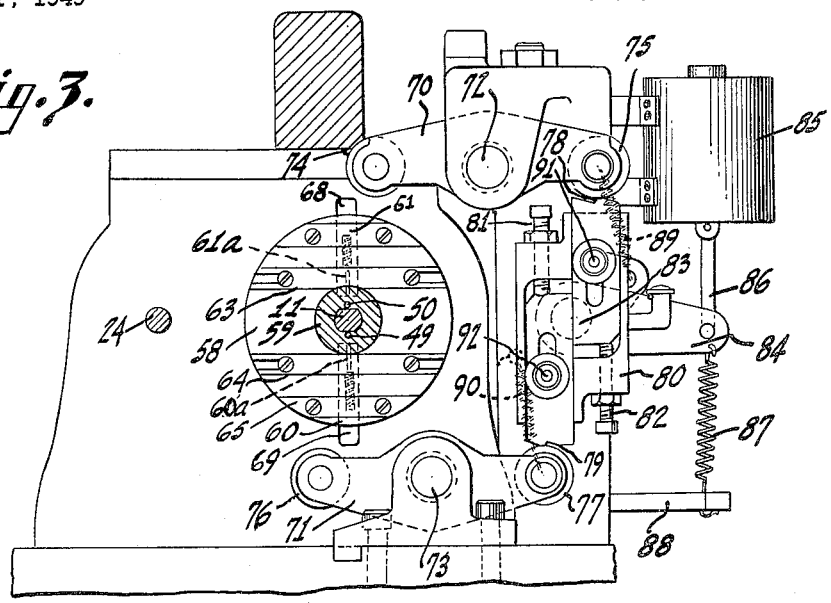
Figure 3 is a view partly in section along the line 3—3 of Figure 2 and shows the swedging means according to my invention.

The apparatus according to the invention includes means for feeding grid side rod stock, a grid winding head for winding grid wire on said stock, a side rod swedger, and correlating means for the elements referred to.

Feeding means

The feeding means for side rod stock includes means for supporting and rotating the side rod stock and means for advancing the side rod stock longitudinally for traversing the regions of the winding head and the swedger.

The feeding means of the apparatus as well as the relationship between the several elements of the apparatus are shown in Figure 1. The winding head and swedges are shown in more detail in the other figures of the drawing.

Figure 2:
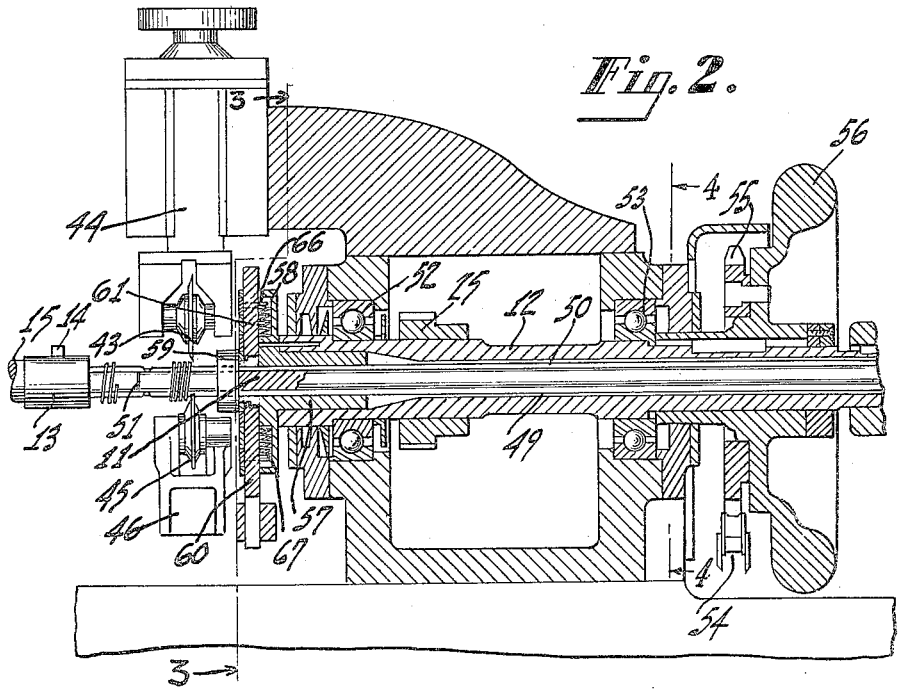
Figure 2 is a longitudinal sectional elevation along the line 2—2 of Figure 1 and shows the winding head and swedging means of my novel apparatus.

Referring to Figure 1 the means for supporting and rotating the side rod stock 49, 50 shown in Figure 2 comprises a mandrel 11 mounted in and rotatable with sleeve 12. The means for longitudinally moving the side rod stock may comprise an assembly including a clamp 13 having a clamp handle 14 for engaging the free end of side rod stock. The assembly also includes a sleeve 15 fixed at one end thereof to clamp 13 and having a longitudinal groove 16. At the other end of sleeve 15 is fixed a split nut assembly 17 having a release handle 18. Also part of the assembly is screw 19 fixed at 20 and having threads for engaging the threads of the split nut of assembly 17. A spur gear 21 is keyed to the slot 16 of sleeve 15 so as to be rotatable with the sleeve while permitting the sleeve to travel transversely with respect to the gear. Bearings 22, 23 support the spur gear 21 for rotation while preventing any lateral movement of the gear. Rotation of spur gear 21 imparts rotation to sleeve 15, which causes it to advance along the screw 19 as a result of the engagement of split nut 17 therewith. This advance of the sleeve 15 causes longitudinal movement of a side rod stock through the winding head and swedger 10.

To correlate the velocities of rotation of sleeves 12 and 15 to prevent torsional strains on the side rod stock that would result from an inequality in these velocities, both sleeves are geared to a common shaft 24. Sleeve 12 is geared to shaft 24 by spur gear 25 fixed to sleeve 12 and by spur gear 26 fixed to shaft 24. Sleeve 15 is geared to shaft 24 by gear 21 on sleeve 15 and spur gear 27 keyed to shaft 24. Each of the spur gears referred to may have an equal number of teeth to assure an equal angular velocity of sleeves 12 and 15.

Winding head

Referring to Figure 2, the winding head of the apparatus includes a notching wheel 43 mounted on a vertically adjustable support 44, and a peening wheel 45 mounted on adjustable support 46. The winding head also includes a grid wire feed assembly shown in Figure 1 comprising guide 47 and reel of grid wire 48. Mandrel 11 extends through sleeve 12 and supports side rod stock 49, 50 on opposite sides thereof. The mandrel may extend across the winding head to terminate at 51 to thereby serve as an anvil for the notcher and peener.

Sleeve 12 is mounted in bearings 52, 53 for rotation. Such rotation of sleeve 12 is provided by chain 54 engaging sprocket wheel 55 keyed to shaft 12, and connected to a power source, not shown. Manual control of rotation of sleeve 12 is provided by hand wheel 56.

Swedging mechanism

Figure 6:
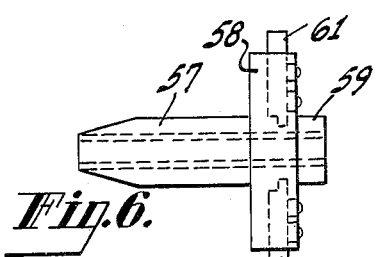
Figure 6 is a side view of the support for the swedging hammers.

The swedging mechanism includes a sleeve 57 extending into and keyed to an enlarged inner portion of sleeve 12 for rotation therewith. Sleeve 57 is integral with a flange or disc-like portion 58 shown more clearly in Figure 6 and having a nose portion 59. Supported in grooves in the flange or disc 58 are two elongated hammers 60, 61. Bands 62, 63, 64, 65, as shown in Figure 3 serve to hold the hammers in position while permitting radial movements thereof. Springs 66, 67 shown in Figure 2 serve to urge the hammers away from each other. The centrifugal force resulting from rotation of disc 58 is by itself insufficient to cause relative movement of the hammers. Portions 68, 69 of the hammers extend beyond the periphery of disc 58 for a purpose to be described.

The swedging means also includes a system of cams and levers shown in Figure 3 for actuating the hammers 60, 61. This system comprises two levers 70, 71 pivoted at 72 and 73, respectively, for rotation. At the ends of lever 70 are provided wheels 74, 75, and at the ends of lever 71 are mounted wheels 76, 77. Wheels 75, 77 are adapted to engage cam surfaces 78, 79, respectively, on cam assembly 80 for varying the spacing between wheels 75 and 77. The cam assembly includes two adjusting screws 81, 82 for adjusting the magnitude of separation of cam surfaces 78, 79 from each other.

The cam assembly 80 is keyed to shaft 83 for rotation thereon. Also keyed to shaft 83 is a lever 84. One end of this lever is connected to solenoid 85 by connecting rod 86 and urged downward by spring 87 mounted on fixed stud 88. Actuation of solenoid 85 to retract or extend rod 86 results in rotation of shaft 83 and cam assembly 80.

A clockwise rotation of cam assembly 80 caused by a retraction of rod 86 into solenoid 85, results in engagement between the lower portions of cam surfaces 78, 79 and the wheels 75, 77 of levers 70, 71 to cause wheels 75, 77 to approach each other and to cause wheels 74, 76 to recede from each other. The consequent increase in separation of wheels 74, 76 and of the ends of levers 70, 71 on which they are mounted, permits free rotation of disc 58 with the projecting ends 68, 69 of hammers 61, 60 free from contact with wheels 74, 76. Under this condition the hammers 61, 60 are extended radially away from engagement with side rod stock 49, 50.

A counterclockwise rotation of shaft 83 resulting from an outwardly extending movement of rod 86 from solenoid 85 causes engagement between the raised portions of cam surfaces 78, 79 and the wheels 75, 77 resulting in an increment in separation of wheels 75, 77. This causes wheels 74, 76 to approach each other to provide a predetermined separation therebetween. This predetermined separation is of a magnitude to cause the inner ends of hammers 60, 61 to extend into a transverse portion of the side rod stock 49, 50 to form swedges therein when the projecting ends 68, 69 of the hammers are engaged by wheels 74, 76.

Figures 8, 9:
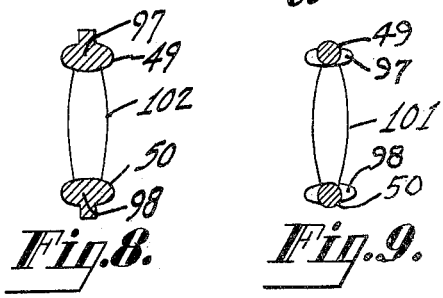
Figure 8 is a cross section along the line 8—8 of Figure 7 and shows the deformation effected in side rods incidental to a swedge made by novel apparatus.
Figure 9 is a view along the line 9—9 of Figure 7 and shows the swedge deformations in relation to undeformed portions of the side rods.

The inner ends of the hammers may be provided with slots 60a, 61a, to provide a swedge having the configuration indicated in Figure 8. It will be noted that this configuration includes a rib traversing the swedge longitudinally of the side rod stock for increasing resistance of the side rod stock to deformation.

The wheels 75, 77 and the ends of levers 70, 71 on which they are mounted are urged together by springs 89, 90 so that the wheels referred to follow the raised and lower portions of cam surfaces 78, 79 in response to rotation of cam assembly 80.

To permit adjustment of the maximum separation and approach of wheels 74, 76, the separation of cam surfaces 78, 79 may be adjusted by set screws 91, 92 shown in Figure 3.

Figure 4:
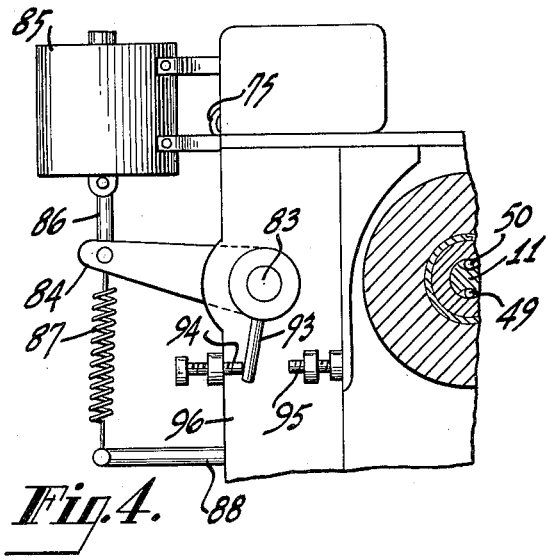
Figure 4 is a fragmentary sectional view along the line 4—4 of Figure 2.

Means for limiting the magnitude of thrust of connecting rod 86 is shown in Figure 4. This means includes an arm 93 keyed to shaft 83 and adapted to abut against screws 94, 95 fixed to the housing 96 of the apparatus. When the shaft is rotated in a clockwise direction as viewed in Figure 4 as a consequence of an upward thrust of rod 86, arm 93 is rotated until it abuts against screw 94. This stops further rotation of shaft 83 and limits the extent of the upward thrust of rod 86. When the thrust of rod 86 is downward, arm 93 abuts against screw 95 at the end of a predetermined magnitude of rotation of shaft 83 in a counterclockwise direction. Screws 94, 95 are adjusted to limit the rotation of shaft 83 to a value sufficient for successively causing engagement between the lower and upper portions of cam surfaces 78, 79 and wheels 75, 77 as shown in Figure 3.

Correlating means

Figure 5:
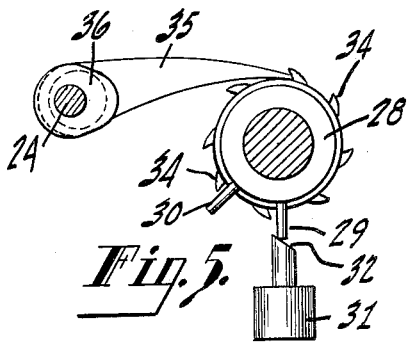
Figure 5 is a view along the line 5—5 of Figure 1 and illustrates a swedging control according to the invention for controlling the swedging operation.

Means are also provided for correlating the grid winding operation with the swedging operation. This means may include a cam 28 shown best in Figure 5 having arms 29, 30 for closing a switch 31 having a plunger provided with an inclined end surface 32. The cam 28 is fixed to shaft 33 for rotation therewith. Also fixed to shaft 33 is ratchet wheel 34 which, in association with pawl 35 mounted for rotation on eccentric bearing 36, serves to rotate shaft 33 in a predetermined annular velocity relation to shaft 24. The ratio of velocity of rotation of shafts 24 and 33 may be such that shaft 33 is given one rotation to a plurality of rotations of shaft 24 required for the completion of one grid. Arms 29, 30 may be disposed on cam 28 in such space relation with respect to each other that switch 31 is actuated successively to energize the swedging means at both end portions of a grid at a location thereon spaced critically from adjacent fixed grid turns or from the ends of severed grids. Actuation of switch 31 in turn energizes solenoid 85 connected to cam assembly 80.

The number of teeth in ratchet wheel 34 may be equal to the number of rotations required of shaft 24 in order to cause the fabrication of an individual grid. Consequently, when cam 28 is actuated to close switch member 31 it serves to maintain the switch closed for approximately a full revolution of grid mandrel 11. Since the disc 58 supporting the swedging hammers rotates at the same rate as mandrel 11, a full rotation of the disc 58 would bring the swedging hammers into contact with the levers 70, 71 twice to provide a double swedge on the side rod stock. In addition a swedging action of substantial duration would oppose the longitudinal movement of the side rod stock and might jam the apparatus and distort the grid. This is undesirable and for the purpose of avoiding the difficulties referred to, there is provided according to the invention a timer shown schematically at 37 which may be of a conventional type. The function of the timer is to open the circuit energizing the swedging means prior to the opening thereof by the contact 31 and after a partial rotation of disc 58 to assure the formation of only one swedge on the side rod stock and to limit the duration of a swedging action to avoid jamming the apparatus.

Each of shafts 24 and 33 are supported for rotation in appropriate bearings. Thus bearings 38, 39, 40 support shaft 24 and bearings 41 and 42 support shaft 33.

General features

The combined grid winding and swedging apparatus of the invention incorporates therein a well known feature of grid winding machines for winding grids in the form of a grid strip including a plurality of individual grids. This feature of grid winding machines involves the application of fixed grid turns to portions of the strip for providing the wound portion of individual grids and the application of loose turns between adjacent ones of such individual grids. This is advantageous in that a severing of the grid strip to provide several grids may be accomplished at the portions of the strip having the loose turns, which turns may be readily removed from the severed grids. The grid strip may be severed accurately midway between terminal fixed turns of adjacent grids to provide uniformity in the side rod length extending beyond the fixed turns of a grid.

The application of loose turns of grid wire by the winding head may be accomplished by moving the notcher and peener away from the mandrel supporting the grid and the grid side rod stock. This is usually done by a cam action, not shown, that alternately brings the notcher and peener into operative relation with respect to the side rod stock, and removes them out of said relation. This action is controlled by and related to the number of rotations of the grid mandrel 11 in well known manner. Once the angular position of shaft 33 has been fixed with respect to the cam action referred to, the apparatus of the invention may be caused to apply swedges to grid side rods at portions thereof to which the loose turns will be applied.

While the swedges may be applied according to the invention to the side rod stock either prior to or after the application of grid turns thereto, it is preferable from several standpoints to form the swedges on the rod stock before any grid turn is applied thereto. It is more convenient to mount the swedging assembly in the body of the apparatus rather than support it as an appendage, for reasons of strength and for reducing the length of the apparatus. Increase in length of the apparatus may result in a sacrifice in the length of the grid strip formed thereby. Furthermore, the relatively high powered impacts applied by the swedging hammers to the side rod stock may adversely affect the form of the rods if applied adjacent an end of the supporting mandrel 11. In addition, the application of a swedge to a grid stock having grid wires thereon might result in a severing of the grid wire, particularly at the loosely applied turns thereof, to cause unravelling thereof and possible damage to the grid strip. The grid winding and swedging apparatus of the invention may be operated at a rotational velocity of the grid mandrel as high as 850 revolutions per minute and loose grid wire ends would possess a relatively high potential for damage at such rotational velocity.

In addition, it is preferable to mount the swedging mechanism relatively close to the winding head at the side thereof facing the source of supply of the side rod stock. This will reduce the number of swedges between the clamp 13 and the source of side rod stock to avoid an excessive weakening of the stock resulting from the swedges. This weakening of the side rod stock is undesirable in view of the relatively large tensile force exerted by clamp 13 on the stock.

Figure 10:
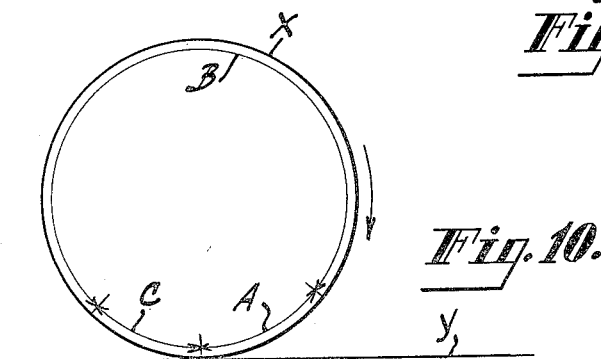
Figure 10 is a schematic representation of the cycles of operation of the grid winding and swedging portions of the apparatus of the invention.

Figure 10 is a schematic representation of the cycles of operation of the grid winding portion and the swedging portion of the apparatus of the invention with respect to grid side rod stock. Cycle X indicates a full cycle of operation of the grid winding portion of the apparatus for completing the winding of an individual grid on side rod stock Y. This cycle includes an initial portion A during which grid turns are loosely applied to the side rod stock. Portion B of the cycle indicates the period when the grid turns are fixed to the side rod stock as by notching and peening. Portion C represents a final loosely wound segment of a grid.

Figure 7:
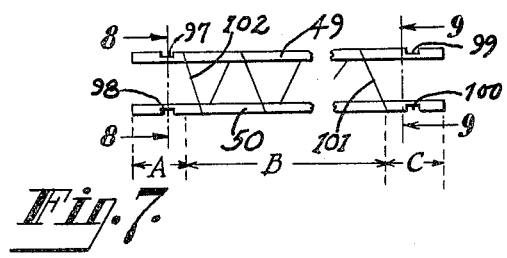
Figure 7 shows a wound grid having swedges on the side rods thereof formed by the apparatus of the invention.

Cycle Z shows the cycle of the swedging mechanism of my novel apparatus. This cycle is displaced in space from cycle X to permit swedging of the side rod stock prior to the winding of grid wire thereon. The swedging portions 29, 30 of cycle Z are angularly related to the portions A and C of cycle X so that the swedges 97, 98, 99, 100, shown in Figure 7 are critically spaced either by reference to the ends of side rods 49, 50, or by reference to terminal turns 101, 102 of grid wire thereon. For example, swedge 97a may be applied at a location on side rod stock Y that is midway between the ends of the loosely applied portion A of cycle X. Another swedge may be applied in similar manner to a succeeding portion of stock Y associated with portion C of cycle X when in registry with portion 30 on cycle Z.

Cycles X and Z are of equal time duration so that once the portions 29, 30 of cycle Z have been correlated with portions A and C of cycle X to provide a swedge at predetermined locations on the stock Y, a plurality of grids may be made in the form of a continuous strip having uniform portions wherein the grid wire is fixed to the stock, other uniform portions wherein the grid wire is loosely applied to the stock, and swedges uniformly disposed at predetermined locations on the side rod stock, to provide accurate orienting and fixing means for the grids in mounts in which they are used.

Operation of the apparatus

Operation of the combined grid winding and swedging apparatus of my invention may be initiated by manually closing a switch, not shown. This action energizes a power source, not shown, to which chain 54 is connected. This energization causes rotation of sleeve 12 and mandrel 11 of the winding assembly and sleeve 57 and disc 58 of the swedging assembly. Rotation is also imparted to shaft 24 by gears 25, 26 and to shaft 33 by paul 35 and ratchet wheel 34. Shaft 24 in turn causes rotation of sleeve 15 and split nut 18 on lead screw 19, by means of spur gears 21, 27.

Assuming shaft 33 rotates once during a plurality of rotations of sleeves 12 and 15 referred to for the completion of a grid, and that the arms 29, 30 are spaced along the periphery of cam 28 for providing a swedge at a predetermined location on grid side rod stock with respect to the first and last grid turns on the rod stock, rotation of shaft 33 causes arm 29 to trip switch 31 o energize solenoid 85. This causes levers 70, 71 to rotate in response to enggement of the raised portions of cam surfaces 78, 79 resulting in a reduced separation of wheels 74, 76 from each other and disposition thereof in the arcuate path of travel of projecting portions 68, 69 of the swedging hammers. While the switch 31 and cam 28 provide a control that is accurate to within one rotation of the disc 58 of the swedging assembly, a more critical control is provided by timer 37 to within a fraction of a rotation of the disc. This more critical control is advantageous in that it prevents the application of a double swedge to the side rod stock which might take place during a full rotation of disc 58 and avoids the hazzard of damage to the apparatus and distorted grids. Deenergization of solenoid 85 by timer 37 results in a radially outward movement of hammers 60, 61 out of engagement with the side rod stock in response to the force exerted by springs 66, 67, the wheels 74, 76 having separated from each other in magnitude sufficient to permit clearance with respect to the projecting portions of the hammers. A further partial rotation of shaft 33 causes arm 30 of the contact to actuate switch 31 to initiate a second swedging operation on the side rod stock. The winding operation continues until an individual grid is completed.

A plurality of grids may be formed in this manner in a continuous strip, the length of the strip being dependent on the length of lead screw 19. The disposition of the arms 29, 30 on the cam 28 is such that the larger arc between the arms determines the magnitude of separation of the swedges applied to the end portions of one grid, while the smaller arc represents a separation of adjacent swedges on adjacent grids in the grid strip.

After the winding and swedging of a completed grid strip is accomplished, the side rod stock may be severed in a well known manner adjacent the winding head to separate the strip from unused side rod stock. The clamp 13 is then opened to release the strip from the apparatus. The split nut 22 may then be released from engagement with screw 19 by means of handle 18 to permit sleeve 15 to be moved to the right as viewed in Figure 1 for receiving the leading end of the side rod stock from which the previous grid strip was cut.

It will thus be apparent that I have provided a novel and advantageous apparatus that combines grid winding and side rod swedging operations under conditions that permit unitary control of the two operations for securing increased accuracy in correlating the swedges with predetermined grid turns of a grid and for economy in grid manufacture resulting from mechanization of a previously required manual operation.

The foregoing is presented as an illustrative embodiment of my invention and as such is subject to variations as will be apparent to persons skilled in the art without departing from the spirit of the invention, and it is desired to include such variations within the scope of the appended claims.

I claim:

1. In a grid making apparatus for winding groups of grid turns on grid side rods and swedging said rods intermediate said groups of turns to provide reference means thereon, the improvement comprising the combination of anvil means, means for axially advancing said side rods and said anvil means in contacting relation, and means fixed axially of said side rods for swedging said side rods against said anvil means to provide a swedge therein having a predetermined extent longitudinally of said side rods, said last named means including a rotatable structure having an axial passageway for receiving said advancing side rods, hammers angularly spaced on said structure for movement radially of said axial passageway and for rotation with said structure, a first resilient means connected to said hammers and urging said hammers away from said axial passageway, said hammers having a striking end extending along the axis of said passageway said predetermined extent, movable cams adjacent the path of said hammers, a second resilient means connected to said cams and urging said cams away from said path, a solenoid connected to said cams, a switch, a switch tripping mechanism adjacent said switch and connected to said means for advancing said side rods, said mechanism being operable at the end of said groups of grid turns to trip said switch for initiating energization of said solenoid for causing said cams to move into said path of said hammers and causing said hammers to strike said side rods, and a second switch connected to said apparatus and synchronized with said switch tripping mechanism for deenergizing said solenoid after one engagement only between said cams and said hammers during a swedging operation, whereby said cams are moved out of said path by said second resilient means and said hammers are moved away from said passageway by said first resilient means and a swedge is provided on said side rods having said predetermined extent longitudinally thereof.

2. In a grid making apparatus for winding groups of grid turns on parallel grid side rods and swedging said rods intermediate said groups of turns to provide swedges therein of predetermined dimension along said rods for service as critical reference means, the improvement comprising means for continuously moving said rods longitudinally during a cycle of operation of said apparatus for providing a plurality of said groups of grid turns on said side rods, a mandrel extending parallel to and engaging said rods, and swedging means adjacent the path of said side rods and fixed against movement along the longitudinal axes of said side rods, said swedging means comprising a structure including swedging hammers supported for movement in paths extending transversely of and including portions of said side rods having said predetermined dimension, a first resilient means engaging said hammers for urging said hammers from said side rods, impact members for striking said hammers, a second resilient means engaging said impact members and urging the same away from said hammers, a rotatable control member connected to said apparatus and synchronized with the longitudinal movement of said side rods, a solenoid conencted to said impact members, a switch connected to said solenoid and disposed in the path of movement of said rotatable control member for engagement thereby for energizing said solenoid and thereby actuating said impact members to cause said hammers to move in opposition to said resilient means, to said portions of said side rods for providing swedges therein, and a second control member connected to said apparatus for deenergizing said solenoid and stopping the actuation of said impact members after said hammers have moved once only to said side rods, whereby said impact members are withdrawn from said impact hammers by said second resilient means, and said hammers are retracted from said side rod portions by said first resilient means and said swedges have said predetermined dimension along said side rods.

3. In an apparatus for making a wound grid having two opposite side rods, the improvement comprising in combination an elongated anvil having opposite sides adapted to engage said side rods in parallel relation, a support for said anvil, means for rotating said support and anvil axially of the anvil, means for longitudinally advancing said side rods in synchronized relation with said means for rotating, and a swedging mechanism including a member mounted on said support for rotation therewith, said member having a surface normal to the axis of said anvil and a passageway coaxial with said anvil for receiving said anvil and the side rods engaged thereby, two elongated swedging hammers mounted on said surface and movable thereon radially of said passageway, said hammers being oppositely disposed in the plane of the axes of said anvil and side rods, resilient means engaging said hammers and urging the hammers away from said passageway and disposing the remote ends of the hammers in a predetermined path, said mechanism including two cams pivotally supported adjacent said member and on opposite sides of said passageway, resilient means connected to said cams urging said cams out of said path, means correlated to said means for advancing the side rods, for moving said cams into said path and against the force of said last named resilient means, whereby said hammers are simultaneously engaged by said cams and moved against opposite sides of said side rods, and means connected to said correlated means for deactivating said correlated means after one impact only by said hammers during a swedging cycle, whereby said cams are moved out of said path by said second named resilient means and said swedging hammers are moved radially away from said passageway by said first named resilient means.

4. The improvement in the apparatus for making a wound grid according to claim 3, and wherein said correlated means comprises a switch tripping member connected to and synchronized in movement with said means for advancing the side rods, a switch adjacent said tripping member for tripping thereby during a predetermined portion of the cycle of operation of said means for advancing, and a solenoid connected electrically to said switch and mechanically to said cams, said solenoid being responsive to a tripping of said switch in power transfer to said cams for moving said cams into said path for engaging and moving said hammers in a swedging operation.

5. In an apparatus for making a wound grid having a predetermined number of side rods, the improvement comprising an elongated mandrel adapted to support said side rods, elongated swedging hammers in said predetermined number supported in an array wherein their axes extend radially of said mandrel and are arcuately equidistantly spaced and in transverse registry with said side rods, means for rotating said mandrel, rods and hammer array on the axis of said mandrel while preserving said registry, said hammers having ends remote from said mandrel, resilient means urging said hammers away from said mandrel and into a predetermined path, a plurality of cams in said predetermined number adjacent said hammer array and movable on fixed pivots, means synchronized with said rotating means for moving said cams into said path to engage said remote ends of said hammers and move said hammers toward said mandrel and across said side rods for swedging said side rods, means connected to said synchronized means for de-energizing said synchronized means before said mandrel has rotated through the angle between adjacent ones of said hammers, and resilient means connected to said cams urging the cams out of said path, whereby each of said side rods is swedged by one impact only of the swedging hammers during a swedging cycle.

References Cited in the file of this patent

UNITED STATES PATENTS

| | | |
|---|---|---|
| 936,435 | Evans | Oct. 12, 1909 |
| 1,480,077 | Johnson | Jan. 8, 1924 |
| 1,496,583 | Lukes | June 3, 1924 |
| 1,994,307 | Flaws | Mar. 12, 1935 |
| 2,002,220 | Douglas | May 21, 1935 |
| 2,068,628 | Kroenwetter | Jan. 19, 1937 |
| 2,181,288 | Washburn | Nov. 28, 1939 |
| 2,426,522 | Porter | Aug. 26, 1947 |
| 2,481,202 | Dale | Sept. 6, 1949 |

FOREIGN PATENTS

| | | |
|---|---|---|
| 17,774 | Australia | May 30, 1934 |